(12) United States Patent
Breault et al.

(10) Patent No.: US 6,316,135 B1
(45) Date of Patent: Nov. 13, 2001

(54) DIRECT ANTIFREEZE COOLED FUEL CELL

(75) Inventors: Richard D. Breault, North Kingstown, RI (US); David A. Condit, Avon, CT (US); Albert P. Grasso, Vernon, CT (US); Michael E. Gorman, Glastonbury, CT (US)

(73) Assignee: International Fuel Cells LLC, South Winsdor, CT (US)

( * ) Notice: Subject to any disclaimer, the term of this patent is extended or adjusted under 35 U.S.C. 154(b) by 0 days.

(21) Appl. No.: 09/359,475

(22) Filed: Jul. 22, 1999

(51) Int. Cl.$^7$ .................................................. H01M 8/04
(52) U.S. Cl. ................................................ 429/22; 429/26
(58) Field of Search ............................................ 429/22, 26

(56) References Cited

U.S. PATENT DOCUMENTS

| | | | |
|---|---|---|---|
| 3,779,811 | * 12/1973 | Bushnell et al. | 429/26 |
| 5,176,966 | 1/1993 | Epp et al. | 429/26 |
| 5,700,595 | 12/1997 | Reiser | 429/13 |
| 5,776,624 | * 7/1998 | Neutzler | 429/26 |
| 6,013,385 | * 1/2000 | DuBose | 429/26 X |

FOREIGN PATENT DOCUMENTS 198 02 490 * 7/1999 (DE) .

* cited by examiner

Primary Examiner—Stephen Kalafut
(74) Attorney, Agent, or Firm—Malcolm J. Chisholm, Jr.

(57) ABSTRACT

A direct antifreeze cooled fuel cell is disclosed for producing electrical energy from reducing and process oxidant fluid streams that includes an electrolyte secured between an anode catalyst and a cathode catalyst; a porous anode substrate secured in direct fluid communication with and supporting the anode catalyst; a porous wet proofed cathode substrate secured in direct fluid communication with and supporting the cathode catalyst; a porous water transport plate secured in direct fluid communication with the porous cathode substrate; and, a direct antifreeze solution passing through the porous water transport plate. In operation of the fuel cell, because product water generated electrochemically at the cathode catalyst flows away from the cathode catalyst into the cathode substrate and into the water transport plate and because the cathode substrate is wetproofed, the antifreeze solution passing through the water transport plate remains essentially within this plate. In a preferred embodiment, the antifreeze solution passing through the water transport plate may be directed to flow at a pressure less than that of the oxidant stream passing adjacent the cathode substrate.

18 Claims, 2 Drawing Sheets

DIRECT ANTIFREEZE COOLED FUEL CELL

TECHNICAL FIELD

The present invention relates to fuel cells that are suited for usage in transportation vehicles, portable power plants, or as stationary power plants, and the invention especially relates to a fuel cell that utilizes an antifreeze solution passing through the fuel cell to remove heat from the cell.

BACKGROUND OF THE INVENTION

Fuel cell power plants are well-known and are commonly used to produce electrical energy from reducing and oxidizing fluids to power electrical apparatus such as apparatus on-board space vehicles. In such power plants, a plurality of planar fuel cells are typically arranged in a stack surrounded by an electrically insulating frame structure that defines manifolds for directing flow of reducing, oxidant, coolant and product fluids. Each individual cell generally includes an anode electrode and a cathode electrode separated by an electrolyte. A reactant or reducing fluid such as hydrogen is supplied to the anode electrode, and an oxidant such as oxygen or air is supplied to the cathode electrode. In a cell utilizing a proton exchange membrane ("PEM") as the electrolyte, the hydrogen electrochemically reacts at a surface of the anode electrode to produce hydrogen ions and electrons. The electrons are conducted to an external load circuit and then returned to the cathode electrode, while the hydrogen ions transfer through the electrolyte to the cathode electrode, where they react with the oxidant and electrons to produce water and release thermal energy.

The anode and cathode electrodes of such fuel cells are separated by different types of electrolytes depending on operating requirements and limitations of the working environment of the fuel cell. One such electrolyte is the aforesaid proton exchange membrane ("PEM") electrolyte, which consists of a solid polymer well-known in the art. Other common electrolytes used in fuel cells include phosphoric acid or potassium hydroxide held within a porous, non-conductive matrix between the anode and cathode electrodes. It has been found that PEM cells have substantial advantages over cells with liquid acid or alkaline electrolytes in satisfying specific operating parameters because the membrane of the PEM provides a barrier between the reducing fluid and oxidant that is more tolerant to pressure differentials than a liquid electrolyte held by capillary forces within a porous matrix. Additionally, the PEM electrolyte is fixed, and cannot be leached from the cell, and the membrane has a relatively stable capacity for water retention.

Manufacture of fuel cells utilizing PEM electrolytes typically involves securing an appropriate first catalyst layer, such as a platinum alloy, between a first surface of the PEM and a first or anode porous substrate layer to form an anode electrode adjacent the first surface of the PEM, and securing a second catalyst layer between a second surface of the PEM opposed to the first surface and a second or cathode porous substrate layer to form a cathode electrode on the opposed second surface of the PEM. The anode catalyst, PEM, and cathode catalyst secured in such a manner are well-known in the art, and are frequently referred to as a "membrane electrode assembly", or "M.E.A.", and will be referred to herein as a membrane electrode assembly. In operation of PEM fuel cells, the membrane is saturated with water, and the anode electrode adjacent the membrane must remain wet. As hydrogen ions produced at the anode electrode transfer through the electrolyte, they drag water molecules in the form of hydronium ions with them from the anode to the cathode electrode or catalyst. Water also transfers back to the anode from the cathode by osmosis. Product water formed at the cathode electrode is removed from the cell by evaporation or entrainment into a gaseous stream of either the process oxidant or reducing fluid. In fuel cells containing porous reactant flow fields, as described in U.S. Pat. No. 4,769,297, owned by the assignee of all rights in the present invention, a portion of the water maybe alternatively removed as a liquid through the porous reactant flow field to a circulating cooling fluid.

While having important advantages, PEM cells are also known to have significant limitations especially related to liquid water transport to, through and away from the PEM, and related to simultaneous transport of gaseous reducing fluids and process oxidant fluids to and from the electrodes adjacent opposed surfaces of the PEM. The prior art includes many efforts to minimize the effect of those limitations. Use of such fuel cells to power a transportation vehicle gives rise to additional problems associated with water management, such as preventing the product water from freezing, and rapidly melting any frozen water during start up whenever the fuel-cell powered vehicle is operated in sub-freezing conditions. Known fuel cells typically utilize a coolant system supplying a flow of cooling fluid through the fuel cell to maintain the cell within an optimal temperature range. Where the cooling fluid is a solution including water it also must be kept from freezing. It is known to utilize an antifreeze solution such as ethylene glycol and water or propylene glycol and water as a cooling fluid in such coolant systems. However, such antifreeze solutions are known to be adsorbed by and poison the catalysts that form electrodes. Furthermore, those antifreeze solutions have low surface tensions which results in the solutions wetting any wet-proofed support layers adjacent cell catalysts, thereby impeding diffusion of reactant fluids to the catalysts, which further decreases performance of the electrodes. Also, the vapor pressure of those antifreezes is too high, resulting in excessive loss rates of the antifreeze solutions through fuel cell exhaust streams or from steam produced in boilers of fuel processing components of fuel cell power plants. Therefore coolant systems of fuel cells that utilize an antifreeze solution are known to be sealed from the electrodes, so that the solution is not in direct fluid communication with the electrodes. Sealing the coolant system from direct fluid communication with the cell and hence with the product water formed at the cathode electrode results in decreased cell performance due to less efficient removal of the product water. Fuel cells with sealed coolant plates typically remove product water as an entrained liquid. This requires a tortuous serpentine flow path with a resultant high pressure drop. An example of such a cell is shown in U.S. Pat. No. 5,773,160. That type of cell is not suitable for operating at near ambient reactant pressures which is a preferred operating pressure for many fuel cell systems. The decreased performance of cells with sealed coolant plates requires that additional cells be used to satisfy the design power requirement. The additional cells combined with heavier coolers associated with sealed coolers results in an increase in weight and volume of a fuel cell power plant which is undesirable for a fuel cell used to power a vehicle.

Additionally, where a fuel cell powers a vehicle, the atmosphere serving as a process oxidant stream directed into contact with the cathode electrode will vary significantly in humidity. Consequently, it is known to undertake substantial efforts to humidify the process oxidant and reducing fluid streams in order to minimize water loss from the PEM electrolyte. Known efforts include recycling some of the product water from the cell, and/or directing some of the cooling fluid within the coolant system as a vapor into the process oxidant and/or reducing fluid streams entering the fuel cell. However, with known fuel cells, the humidity enhancing fluid must be free of any antifreeze solutions in order to prevent the antifreeze from poisoning the catalysts. Therefore, known fuel cells utilize sealed coolant systems that are isolated from humidification systems, or alternatively known humidification systems utilize complex, heavy and large purification or membrane barrier components to isolate from contact with the electrode catalysts any antifreeze solution within the cooling fluid or within the product water mixed with cooling fluid. Such efforts to isolate the antifreeze solution add to the cost, weight and volume of the fuel cell. Accordingly there is a need for a fuel cell that may be operated in sub-freezing conditions that does not require isolating an antifreeze cooling fluid from the cathode and anode electrodes within a sealed coolant system and that also minimizes free water within the system that may be frozen when the fuel cell is not operated.

DISCLOSURE OF THE INVENTION

A direct antifreeze cooled fuel cell is disclosed for producing electrical energy from reducing and process oxidant fluid streams. The fuel cell includes an electrolyte secured between an anode catalyst and a cathode catalyst; a porous anode substrate secured in direct fluid communication with and supporting the anode catalyst; a porous, wetproofed cathode substrate secured in direct fluid communication with and supporting the cathode catalyst; a porous water transport plate secured in direct fluid communication with the porous cathode substrate; and, a direct antifreeze solution passing through the porous water transport plate. In operation of the fuel cell, because product water generated electrochemically at the cathode catalyst flows away from the cathode catalyst into the porous cathode substrate and into the porous water transport plate, and because the porous cathode substrate is wetproofed, the direct antifreeze solution passing through the porous water transport plate remains essentially within the water transport plate and does not make liquid contact with the cathode catalyst.

The direct antifreeze solution may be any organic antifreeze solution that does not wet the wetproofed cathode substrate and that is non-volatile at cell operating temperatures. For purposes herein, "non-volatile" is defined to mean that the antifreeze solution sustains a loss of less than 10% of its antifreeze for every 500 operating hours of the fuel cell at fuel cell operating temperatures. Alternatively, a first preferred direct antifreeze solution may be a special direct antifreeze solution having the following characteristics: 1. a freezing point of at least –20 degrees fahrenheit (hereafter "° F."); 2. a surface tension greater than 60 dynes per centimeter (hereafter "dyne/cm") at a cell operating temperature of about 150° F.; 3. a partial pressure of antifreeze above the solution at about 150° F. that is less than 0.005 mm of mercury (hereafter "mm Hg"); and, 4. that is capable of being oxidized by catalysts of the fuel cell at fuel cell voltages. A second preferred antifreeze solution may be an alkanetriol direct antifreeze solution, and in particular an alkanetriol selected from the group consisting of glycerol, butanetriol, and pentanetriol. The direct, special and alkanetriol direct antifreeze solutions minimize movement of the antifreeze as a vapor out of the water transport plate into contact with the cathode or anode catalysts, and also minimize antifreeze solution loss from any other fuel cell components such as exhaust stream exiting the cell.

In preferred embodiments of the direct antifreeze cooled fuel cell, the anode substrate may also be wetproofed to make it hydrophobic thereby further minimizing movement of the liquid antifreeze solution from the water transport plate into contact with the cathode and anode catalysts.

In an additional embodiment, the direct antifreeze solution passing through the water transport plate may be directed to flow at a pressure that is less than a pressure of the process reactant streams passing adjacent water transport plates. A preferred fuel cell operates at near ambient pressure and the process oxidant stream and reducing fluid stream are pressurized to 1 to 2 pounds per square inch gauge (hereafter "PSIG") above ambient pressure, and the direct antifreeze solution is directed to flow through the water transport plate at about 1 to 2 PSIG below ambient pressure. Such a positive pressure differential between the process oxidant stream and the antifreeze solution within the water transport plate further assists movement of the product water formed at the cathode catalyst through the cathode substrate and into the water transport plate. The positive pressure differential also limits movement of any liquid antifreeze solution flowing within the water transport plate from flowing out of the water transport plate into the higher pressure process reactant streams passing within reactant flow fields defined adjacent to and/or within the porous cathode substrate.

Accordingly it is a general object of the present invention to provide a direct antifreeze cooled fuel cell that overcomes deficiencies of the prior art.

It is a more specific object to provide a direct antifreeze cooled fuel cell that eliminates need for a sealed coolant system for operation in sub-freezing conditions.

It is yet another object to provide a direct antifreeze cooled fuel cell that eliminates need for purification or membrane barrier components of a humidification system between an antifreeze cooling fluid and the fuel cell.

It is another object to provide a direct antifreeze cooled fuel cell that minimizes free liquid water that may freeze when the fuel cell is not operating in sub-freezing conditions.

These and other objects and advantages of the present direct antifreeze cooled fuel cell will become more readily apparent when the following description is read in conjunction with the accompanying drawings.

DESCRIPTION OF THE PREFERRED EMBODIMENTS

Figure 1:
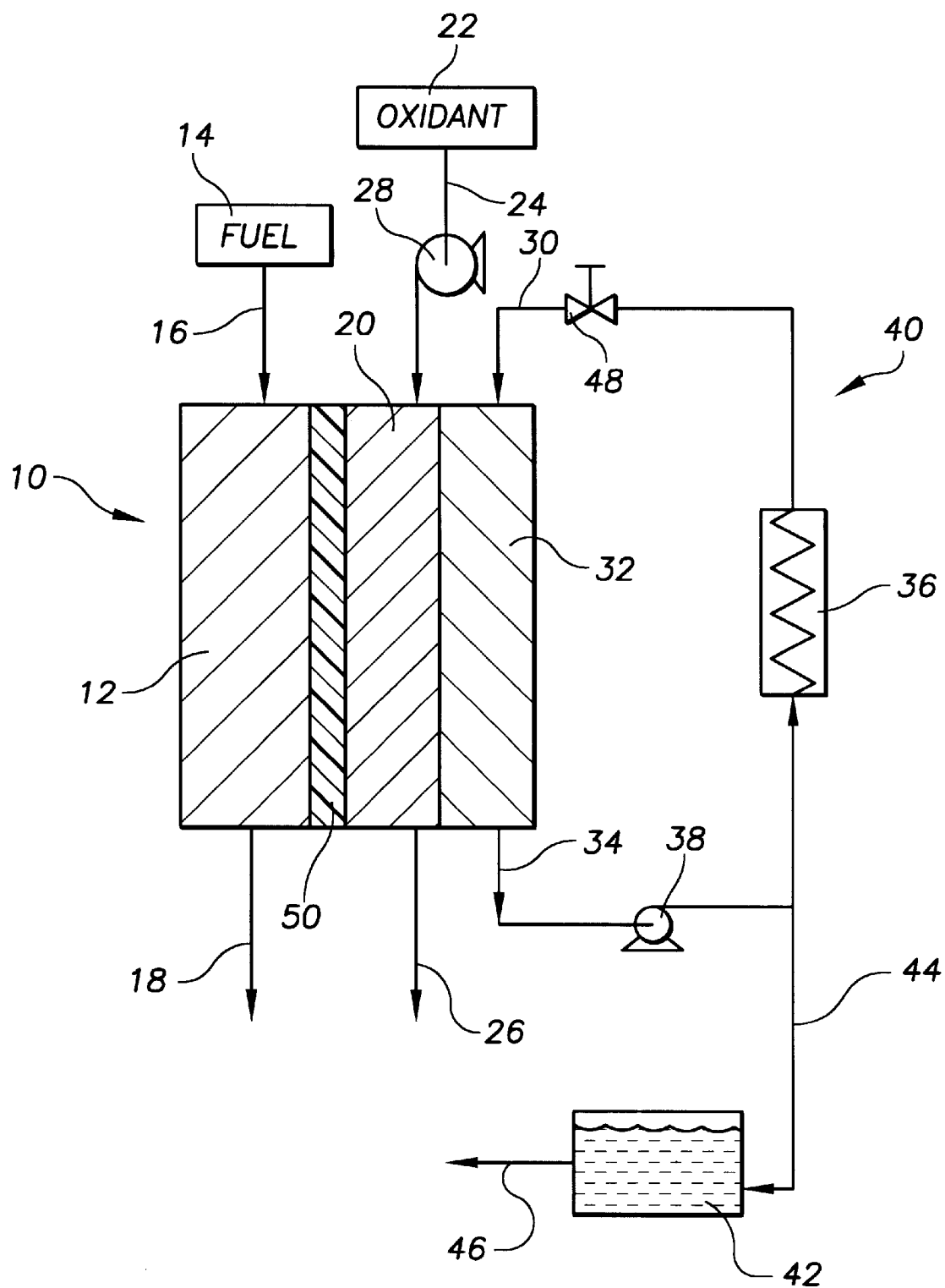
FIG. 1 is a schematic representation of a direct antifreeze cooled fuel cell constructed in accordance with the present invention.

Referring to the drawings in detail, a direct antifreeze cooled fuel cell of the present invention is shown in FIG. 1, and is generally designated by the reference numeral 10. The cell 10 includes an anode flow field 12 that receives a reducing fluid directed from a fuel supply component 14 through a fuel passage 16 to flow through the anode flow field 12 and leave the cell 10 through a reducing fluid vent 18. The cell 10 also includes a cathode flow field 20 that receives a process oxidant stream directed from an oxidant supply component 22 through an oxidant passage 24 to flow through the cathode flow field 20 and out of the cell 10 through an oxidant vent 26. An oxidant blower 28 may be positioned on the oxidant passage 24 to variably flow the gaseous oxidant stream into the fuel cell 10. It is stressed, however, that preferably such a blower only increases operating pressures of the process oxidant stream to a range of from atmospheric pressure to about 1.0–2.0 pounds per square inch above atmospheric pressure, or from about 14.7 to about 16.7 pounds per square inch atmospheric (hereafter "PSIA").

A cooling fluid such as a direct antifreeze solution is directed through a coolant feed line 30 into a porous water transport plate 32 of the fuel cell 10 adjacent the cathode flow field 20, and out of the fuel cell 10 in a coolant discharge line 34. The water transport plate 32 also serves to cool the cell and may be referred to occasionally as a cooler plate. The coolant feed line 30 and coolant discharge line 34 may be in fluid communication with a coolant heat exchanger 36 to cool the cooling fluid, such as a radiator type of heat exchanger common to automobiles. A coolant pump 38 may be secured to the coolant feed line 30 to pump the cooling fluid into the water transport plate 32, coolant discharge line 34, and coolant heat exchanger 36. When the coolant feed line 30, water transport plate 32, coolant discharge line 34 and coolant heat exchanger are in fluid communication as shown schematically in FIG. 1, those components may be characterized as a coolant loop 40, wherein the cooling fluid is described as a cooling fluid such as a direct antifreeze solution circulating through the water transport plate 32 and circulating through the coolant loop 40. Alternatively, the coolant feed line 30 may direct the cooling fluid to pass through the water transport plate without cycling through the coolant loop 40. In such an embodiment, the cooling fluid may be part of an elaborate fuel cell water management system (not shown). A cooling fluid accumulator means 42 for accumulating liquid cooling fluid may also receive some of the cooling fluid and any product water formed within the fuel cell 10 and flowing through the water transport plate 32, coolant discharge line 34 and an accumulator feed line 44. The cooling fluid accumulator means 42 may be well-known accumulator for directing the accumulated cooling fluid and fuel cell product water through an accumulator discharge line 46 so that the cooling fluid and product water may be directed to a cell humidification system (not shown), fuel processing components (not shown), or other components associated with fuel cell power plants as is well-known in the art. The accumulator also accommodates changes in cooling fluid volume due to changes in operating conditions.

The fuel cell 10 may also include a pressure control means for maintaining a positive pressure differential between the process oxidant stream passing through the fuel cell 10 within the cathode flow field 20 and the cooling fluid passing through the cell 10 within the water transport plate 32. The pressure control means may include the coolant pump 38 coordinated with a pressure control valve means for maintaining a specific pressure of the cooling fluid within the coolant feed line 30 down stream of the valve means, water transport plate 32 and coolant discharge line 34, such as pressure control valve 48 secured to the coolant feed line 30 between the coolant pump 38 and the water transport plate 32. As is well-known, the pressure control valve 48 may be set manually, automatically, or, for example, may be electromechanically adjusted based upon a reference pressure within the process oxidant stream within the cathode flow field 20 to restrict flow through the valve 48 so that the stream of cooling fluid drawn into the coolant pump 38 from the coolant feed line 30, water transport plate 32, coolant discharge line 34 and coolant heat exchanger 36 is at a pressure lower than the pressure of the process oxidant stream within the cathode flow field 20. Additional pressure control means for purposes herein may include any well-known mechanism that can reduce pressure of a liquid stream below a reference pressure of a gaseous stream, such as disclosed in U.S. Pat. No. 5,700,595, issued on Dec. 23, 1997 to Reiser and assigned to the assignee of the present invention, which patent is hereby incorporated herein by reference. The materials making up the coolant loop 40 may be manufactured of standard materials well-known in the art such as heat exchangers common to automobile technology, and piping and valving well-known in the aircraft manufacture arts, etc.

The fuel cell 10 also includes a membrane electrode assembly 50 (hereafter occasionally referred to as "M.E.A." for convenience) secured between the anode flow field 12 and cathode flow field 20 that facilitates an electrochemical reaction involving the reducing fluid and oxidant stream to generate electrical energy that is conducted through a standard circuit (not shown) to an energy consuming load, such as an electric motor (not shown) to power, for example, a transportation vehicle (not shown). It is also well-known to secure the fuel cell 10 adjacent a plurality of similar fuel cells (not shown) to form a cell stack assembly enclosed within a frame structure that defines manifolds for directing the reducing fluid, process oxidant, and cooling fluid streams into and out of the fuel cell 10 in a manner well-known in the art.

Figure 2:
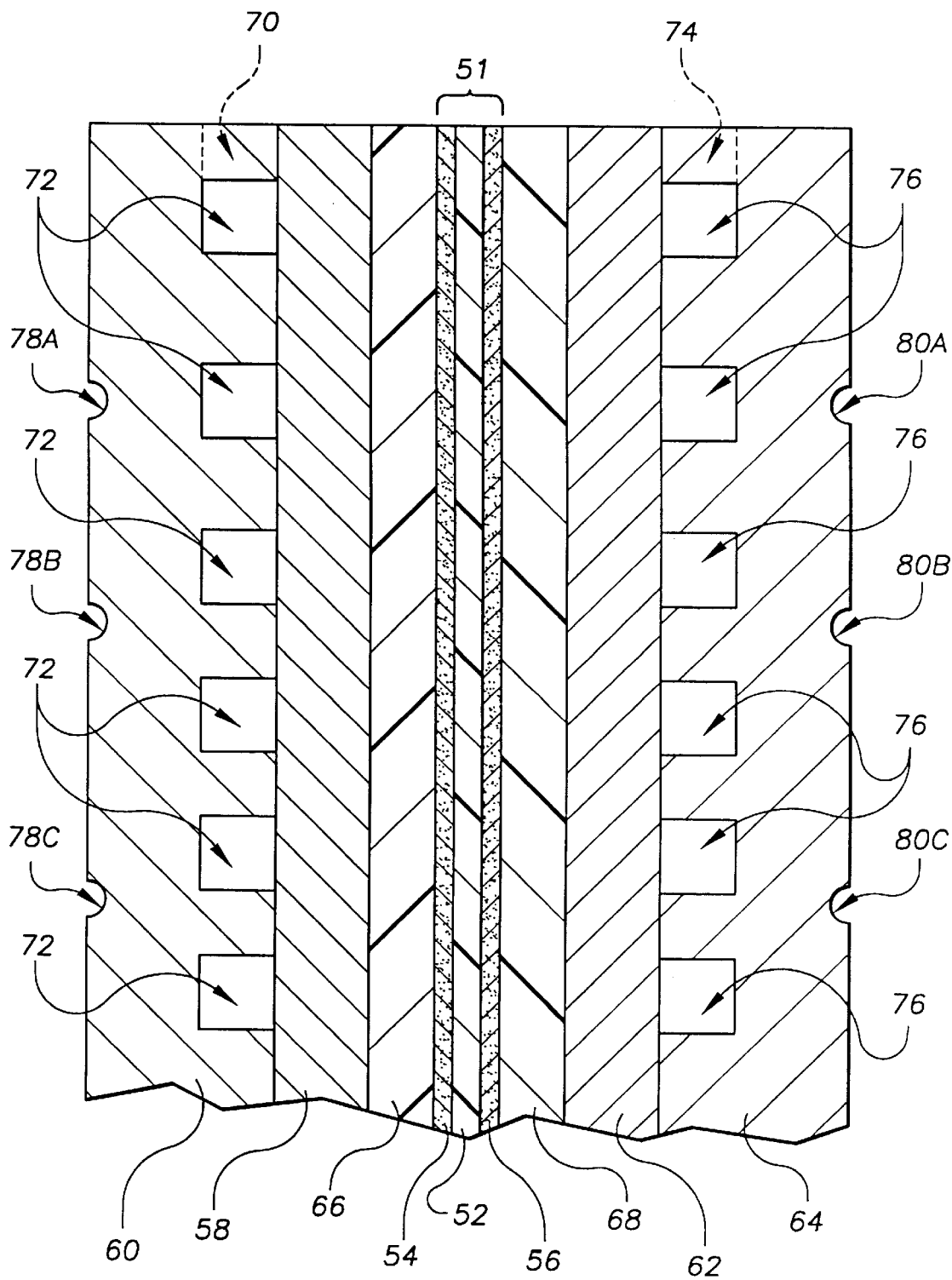
FIG. 2 is a schematic, cross-section, fragmentary view of fuel cell components of a direct antifreeze cooled fuel cell of the present invention showing a membrane electrode assembly, anode and cathode substrates, and anode and cathode water transport plates.

An M.E.A. 51 is shown in greater detail in FIG. 2, and for purposes herein is defined to include an electrolyte 52 such as a proton exchange membrane ("PEM") an anode catalyst 54, and a cathode catalyst 56 secured on opposed sides of the electrolyte 52. The fuel cell 10 also includes a wetproofed anode support means that is secured in direct fluid communication with the anode catalyst 54 between an anode water transport plate 60 and the anode catalyst 54 for passing the reducing fluid stream adjacent the anode catalyst 54. The wetproofed anode support means may include one or more porous layers, such as a porous anode substrate 58, a porous anode diffusion layer 66, or both the porous anode substrate 58 and porous anode diffusion layer 66 secured adjacent each other between the anode water transport plate 60 and anode catalyst 54, wherein at least one of the porous layers is wetproofed.

The fuel cell 10 also includes a wetproofed cathode support means that is secured in direct fluid communication with the cathode catalyst 56 between a cathode water transport plate 64 and the cathode catalyst 56 for passing the process oxidant stream adjacent the cathode catalyst 56. The wetproofed cathode support means may include one or more porous layers, such as a porous cathode substrate 62, a porous cathode diffusion layer 68, or both the porous cathode substrate 62 and porous cathode diffusion layer 68 secured adjacent each other between the cathode water transport plate 64 and cathode catalyst 56, wherein at least one of the porous layers is wetproofed. The porous cathode substrate 62 and porous anode substrate 58 may be porous carbon-carbon fibrous composites having a porosity of about 65% to about 75%, and may be wetproofed by a hydrophobic substance such as "TEFLON" brand polytetrafluoroethylene (as described in more detail below) to a concentration of approximately 0.18 grams per cubic centimeter. The porous cathode gas diffusion layer 68 and porous anode diffusion layer 66 may be about a 50% carbon material and about 50% hydrophobic material such as "TEFLON" brand polytetrafluoroethylene (as described in more detail below).

The porous cathode water transport plate 64 is in direct fluid communication with the porous cathode substrate 62, porous cathode diffusion layer 68 and the cathode catalyst 56. Similarly, the porous anode water transport plate 60 is in direct fluid communication the porous anode substrate 58, porous anode diffusion layer 66 and the anode catalyst 54.

It is pointed out that an anode flow field (shown schematically in the FIG. 1 embodiment at reference numeral 12), may consist, in the FIG. 2 schematic representation, of a fuel inlet 70, and a plurality of fuel flow channels 72 defined within the anode water transport plate 60. Similarly, a cathode flow field may consist of an oxidant inlet 74, and a plurality of oxidant flow channels 76 defined within the cathode water transport plate 64. The anode flow field 12 and cathode flow field 20 may also consist of cavities, differing channels or grooves well-known in the art and defined within fuel cell components to direct the fuel and process oxidant streams to pass in contact with the anode and cathode catalysts 54, 56. As shown in FIG. 2, the porous anode and cathode water transport plates 60, 64 may be structured to cooperate with adjacent water transport plates (not shown) so that anode side coolant channels 78A, 78B and 78C defined within the anode water transport plate 60, and cathode side coolant channels 80A, 80B, and 80C defined within the cathode water transport plate 64 may cooperate in mirror-image association with coolant channels of the adjacent water transport plates of adjacent fuel cells (not shown) in a cell stack assembly to form a network of coolant channels for delivering a cooling fluid stream to the water transport plates 60, 64.

In operation of the fuel cell 10, the anode side coolant channels 78A, 78B, 78C and cathode side coolant channels 80A, 80B, 80C are in fluid communication with the coolant feed channel 30 and coolant discharge line 34, so that a cooling fluid stream from the coolant feed channel 30 passes through the anode and cathode coolant channels, and into the anode and cathode water transport plates 60, 64 to saturate the pore volume of the water transport plates. The cooling fluid stream then passes into the coolant discharge line 34. By filling the open pore volume of the anode and cathode water transport plates, the cooling fluid or direct antifreeze solution stream forms a gas barrier or seal preventing the gaseous reducing fluid in the reducing fluid fuel channels 72 from flowing into oxidant channels in an adjacent cell. By wetproofing the porous anode substrate 58 layer and/or porous anode diffusion layer 66, the liquid antifreeze solution is restricted from moving out of the anode water transport plate 60 and passing through the anode substrate and diffusion layers 58, 66 into contact with the anode catalyst 54.

Similarly, by wetproofing the porous cathode substrate layer 62 and/or cathode diffusion layer 68, the liquid direct antifreeze solution coolant stream is prevented from moving out of the cathode water transport plate 64 and passing through the cathode substrate and cathode diffusion layer and into contact with the cathode catalyst 56. Additionally, as the fuel cell 10 operates, product water formed at the cathode catalyst 56 is removed as water vapor or liquid into the process oxidant stream flowing through the cathode flow field or oxidant channels 76 defined within the cathode water transport plate 64. Therefore, much of the product water moves out of the cathode flow field 76 and into the antifreeze solution coolant stream passing through the porous cathode water transport plate 64, especially when the pressure control valve 48 is causing a positive pressure differential between the process oxidant stream within the cathode flow field and the antifreeze coolant stream within the cathode water transport plate 64.

The direct antifreeze solution may be any organic antifreeze solution that does not wet the wetproofed cathode substrate and that is essentially non-volatile at cell operating temperatures. For purposes herein, "non-volatile" is defined to mean that the antifreeze solution sustains a loss of less than 10% of its antifreeze for every 500 operating hours of the fuel cell at fuel cell operating temperatures. Alternatively, a first preferred direct antifreeze solution may be a special direct antifreeze solution having the following characteristics: 1. a freezing point of at least $-20$ degrees fahrenheit (hereafter "° F.") ; 2. a surface tension greater than 60 dynes per centimeter (hereafter "dyne/cm") at about 150° F.; 3. a partial pressure of antifreeze above the solution at about 150° F. that is less than 0.005 mm of mercury (hereafter "mm Hg"); and, 4. that is capable of being oxidized by catalysts of the fuel cell at fuel cell voltages. A second preferred antifreeze solution may be an alkanetriol direct antifreeze solution, and in particular an alkanetriol selected from the group consisting of glycerol, butanetriol, and pentanetriol. The alkanetriol direct antifreeze may be an antifreeze solution containing any alkanetriol.

An exemplary fuel cell including a PEM electrolyte, wetproofed anode and cathode substrates 58, 62 and anode and cathode diffusion layers 66, 68 demonstrated efficient test performance without unacceptable adsorption of a glycerol-water antifreeze solution to the anode or cathode catalysts 54, 56. The exemplary fuel cell included a 15 micron PEM electrolyte within a membrane electrode assembly acquired from W.L. Gore and Associates, Inc. of Elkton, M. as product identification no. "PRIMEA-5560". The anode catalyst consisted of a platinum-ruthenium alloy containing 0.4 milligrams per square centimeter of platinum and 0.2 milligrams per square centimeter of ruthenium. The cathode catalyst was platinum at 0.4 milligrams per square centimeter.

The porous anode and cathode substrate layers were porous carbon—carbon fibrous composite having a thickness of approximately 0.006–0.007 inches, and a porosity of about 65–75 percent, and were acquired as grade TGP-H-060 from the Toray Company of New York, N.Y. The anode and cathode substrate layers were uniformly wetproofed with "TEFLON" brand polytetrafluoroethylene, grade "FEP-121" sold by the E.I. DuPont Company, of Willmington, Del. to a concentration of approximately 0.18 grams per cubic centimeter by wetproofing procedures well-known in the art.

The porous anode and cathode gas diffusion layers were applied to both the anode and cathode substrates by procedures well-known in the art and described in U.S. Pat. No. 4,233,181, which patent is owned by the assignee of all rights in the present invention, and which patent is hereby incorporated herein by reference. The anode and cathode diffusion layers were approximately 0.003–0.004 inches thick, and had a mass of approximately 5.4 milligrams per square centimeter. The anode and cathode gas diffusion layers consisted of about 50 percent Vulcan XC-72 obtained from the Cabot Corporation of Billerica, Mass. and about 50 percent "TEFLON" brand polytetrafluoroethylene, grade "TFE-30", obtained from the aforesaid E. I. Dupont company. The anode and cathode gas diffusion layers were heated to approximately 660° F. for about 5 minutes to make them wetproofed or hydrophobic.

The cell anode and cathode flow fields were porous and defined within anode and cathode water transport plates. The water transport plates were porous graphite having a mean pore size of approximately 2–3 microns and a porosity of 35–40 percent. The plates were made wettable by treating them with tin oxide in a procedure described in U.S. Pat. No. 5,840,414 owned by the assignee of all rights in the present invention, which patent is here by incorporated herein by reference. The cell had and active area of about 0.4 square feet, with and over all size of approximately 6.0 inches tall by 12 inches wide, by 0.140 inches thick.

A process oxidant stream flowing through the cell defined as a single pass oxidant flow pattern that is characterized herein for convenience as an oxidant flow axis between and oxidant inlet and an oxidant outlet for purposes of comparison to flow patterns of the reducing fluid and antifreeze solution coolant streams passing through the cell. The reducing fluid defined a two-pass reducing fluid pattern flowing essentially perpendicular the oxidant flow axis, crossing the oxidant flow axis twice, and flowing also in a direction generally from the oxidant inlet to the oxidant outlet. The antifreeze solution coolant stream defined a three-pass flow pattern essentially perpendicular to the oxidant flow axis, crossing the oxidant flow axis about three times and flowing generally in a direction from the oxidant outlet to the oxidant inlet. For purposes of convenience, the aforesaid reducing fluid flow pattern will be referred to as transverse-concurrent to the oxidant flow axis, and the aforesaid antifreeze solution coolant stream flow pattern will be referred to as transverse-opposite to the oxidant flow axis. Although this test was done with an antifreeze solution coolant stream flow pattern that was transverse-opposite to the oxidant flow axis, a preferred configuration is transverse-concurrent because that minimizes a cell temperature at the oxidant inlet which maximizes local relative humidity, thereby minimizing humidification requirements and also minimizing drying of the electrolyte.

The cell was operated at a nominal temperature of 65 degrees centigrade (hereafter "° C.") and was nearly isothermal to within approximately plus or minus 5° C. The fuel used for the test performance of the exemplary cell was pure hydrogen gas. The fuel was humidified to approximately 100 percent relative humidity at 65° C. The fuel flow was varied in proportion to the current density of the cell to maintain a hydrogen utilization of 80 percent ("%"). The fuel pressure was approximately 14.7 PSIA. The oxidant used for the test was air. The oxidant was humidified over a range of approximately 0–100% relative humidity at 65° C. by passing the process oxidant stream through a standard saturator. The oxidant flow was varied in proportion to the current density of the cell to maintain an oxygen utilization of 30%. The oxidant pressure was approximately 14.7 PSIA.

The coolant stream used for the test ranged from pure water to 65% glycerol and 35% water. The glycerol used was a certified ACS grade 99.9% glycerol. It is pointed out that use herein of the word "glycerol" as a form of antifreeze solution cooling fluid is meant to include "glycerine", where "glycerine" is understood herein and in general acceptance to include glycerol and water solutions or mixtures. Concentration of the glycerol in the antifreeze solution (glycerol and water. e.p .g., "glycerine") was measured by determining the specific gravity of the glycerol and water solution at 20° C. The antifreeze solution coolant stream was circulated through coolant flow channels in both an anode and a cathode water transport plate that defined anode and cathode flow field channels at a total flow rate of approximately 15 pounds per hour. The inlet and exit temperatures of the coolant stream entering and leaving the cell were 65° C. plus or minus 5° C.

The cell was initially tested with pure water as the cooling fluid. The current density was set at 250 amps per square foot (hereafter "ASF") and the cell voltage was monitored over a period of about 4 hours. Both the fuel and the oxidant were saturated to approximately 100% relative humidity at 65° C. Subsequently the coolant composition was changed to approximately 15, 30, 50 and 65 weight percent glycerol. The performance was monitored for 4 hours after each change in glycerol concentration. The results are listed in Table 1.

TABLE 1

Cell Performance At 250 ASF At Varying Concentrations of Glycerol Antifreeze Solution

| % Glycerol | Initial Cell Voltage in Volts | Cell Voltage After 4 Hours in Volts |
| --- | --- | --- |
| 0 | 0.765 | 0.750 |
| 15 | 0.757 | 0.756 |
| 30 | 0.740 | 0.746 |
| 50 | 0.741 | 0.744 |
| 65 | 0.750 | 0.745 |

The tests producing the results listed in Table 1 were performed over a period of five days, and the tests and results are referred to herein for convenience as the "first tests" of a direct antifreeze cooled fuel cell. The cell was held overnight at 65° C. with nitrogen saturated to 100% relative humidity flowing through both the anode and cathode flow fields. The coolant flow rate was maintained at 15 pounds per hour at 65° C. plus or minus 5° C. at all time during the test. The data in Table 1 demonstrate that there is no adverse effect on performance of replacing water as the coolant with an antifreeze solution that contains up to 65% glycerol.

In a second series of tests, the glycerol concentration was maintained at approximately 60% and the relative humidity of the process oxidant stream was varied from 0% to 100% at the fuel cell oxidant inlet. All of the test parameters of the first tests were as described above for the second tests. The relative humidity of the process oxidant stream was varied from approximately 100% to 57%, 31%, 16% and 0%. The performance of the cell was monitored for 4 hours after each change in oxidant relative humidity. The results of the second tests are listed in Table 2.

TABLE 2

Cell Performance at 250 ASF at Varying Oxidant Relative Humidity % With 60% Glycerol Antifreeze Solution

| Oxidant % Relative Humidity | Initial Cell Voltage in Volts | Cell Voltage After 4 Hours in Volts |
| --- | --- | --- |
| 100 | 0.735 | 0.742 |
| 57 | 0.731 | 0.740 |
| 31 | 0.742 | 0.732 |
| 16 | 0.748 | 0.696 |
| 0 | 0.748 | 0.682* |

*Cell voltage after only one hour.

The data in Table 2 of the second tests demonstrate that there is an adverse effect on fuel cell performance of reducing the process oxidant relative humidity at the fuel cell oxidant inlet below approximately 30% relative humidity. At a process oxidant relative humidity of below 30% within the cathode flow field, the antifreeze solution draws moisture out of the process oxidant stream into the cathode water transport plate. Therefore, moisture moves out of the proton exchange membrane (PEM) into the process oxidant stream at a rate that effectively dehydrates the PEM, and therefore results in a decreased performance of the cell.

In yet another, or third test a 2 inch by 2 inch PEM cell containing a membrane electrode assembly, model no. "PRIMEA-5510", obtained from the aforesaid W.L. Gore Associates Company, was tested. The cell configuration was identical to the previously described tests except that the anode catalyst was 0.4 milligrams per square centimeter of platinum, and there was no coolant.

The cell was operated at 14.7 PSIA at 65° C. on hydrogen and air saturated to about 100% relative humidity with respective utilizations of 80% and 30% at 500 amperes per square foot ("ASF"). A portion of the dry oxidant was passed through a saturator filled with glycerol and then mixed with the humidified air prior to introduction to the cell. The glycerol concentration in the vapor at the oxidant inlet 74 was set to be approximately 4 parts per million which is the equilibrium concentration of glycerol above a 55 weight per cent glycerol solution at 65° C. The objective was to evaluate how quickly glycerol poisoned the cell. This test was run for 16 hours. During this time the cell voltage decayed from an initial value of 0.683 volts to a final value of 0.638 volts. The potential of both electrodes was raised to an air open circuit potential. The performance of the cell after this treatment was that the cell recovered to 0.681 volts.

Cyclic voltammetry on this cell in another, or fourth test showed that glycerol did slowly adsorb onto the anode catalyst; but was cleanly oxidized at a potential of approximately 0.5 volts versus a hydrogen reference.

These tests demonstrate that glycerol is oxidized in a PEM cell in the potential range of typical PEM cells. The normal potential excursions of the electrode during start-up and shutdown of a fuel cell used in vehicular applications should be sufficient to oxidize trace quantities of antifreeze solution which may come into contact with the anode and/or cathode catalysts.

The first and second tests also establish that the direct antifreeze cooled fuel cell 10 can maintain an efficient level of performance, and that having an antifreeze solution in direct fluid communication with the cathode catalyst does not significantly deteriorate cell performance as a result of any adsorption by the cathode catalyst of the antifreeze solution and resulting poisoning of the cell. The cell used in these tests was exposed to a glycerol-water solution for approximately 500 hours hot time at 65° C. and for 125 hours of on load time without exhibiting any adverse performance loss.

Moreover, the results of the first and second tests indicate that the wetproofing or hydrophobic cathode and anode substrate layers and wetproofed or hydrophobic cathode and anode gas diffusion layers effectively limit movement of any significant amount of antifreeze solution from the water transport plates into the membrane electrode assembly where the antifreeze solution would poison the catalysts in the cell. Furthermore, water management dynamics within the cell create a water rich antifreeze solution at the interface between the reactant fluids and the water transport plates. This effectively lowers the antifreeze concentration at this interface which further limits the amount of antifreeze available for transfer to the membrane electrode assembly by diffusion. At the anode catalyst, water condenses from the saturated reducing fluid stream, thus creating a water rich reactant fluid-water transport plate interface. At the cathode catalyst, the production of water and its subsequent flow as a liquid or diffusion as a vapor from the cathode catalyst to the cathode water transport plate also results in a water rich reactant fluid-water transport plate interface.

It is stressed that by the phrase "in direct fluid communication with", it is meant that there are no physical barriers between respective components. For example, in the direct antifreeze cooled fuel cell 10, the porous cathode substrate 62 is secured in fluid communication with the cathode catalyst 56, and the cathode water transport plate 64 is secured in direct fluid communication with porous cathode substrate 62. Consequently, there are no solid barriers to gaseous and/or liquid flow between the cathode water transport plate and the cathode catalyst. For example, it is known to utilize a semi-permeable membrane that restricts gaseous flow, but permits selective liquid communication between components on opposed sides of the membrane for purposes of humidifying gaseous reactant streams, etc. With the direct antifreeze cooled fuel cell 10, no such physical barriers are positioned between the cathode water transport plate 64 and the cathode catalyst 56, and no such barriers are positioned between the anode water transport plate 60 and the anode catalyst 54.

During operation of the direct antifreeze cooled fuel cell 10, product water generated at the cathode catalyst 56 flows into the porous cathode water transport plate 64, the cathode side coolant channels 80A, 80B, 80C, and out of the cell in the coolant discharge line 34 that is in fluid communication with the cathode side channels 80A, 80B, 80C. It is noted that much of the product water generated at the cathode catalyst 56 will also move out of the cell 10 with the process oxidant stream through the oxidant vent 26. Some of the product water within the coolant discharge line 34 that is mixed with the antifreeze solution cooling fluid will move through the accumulator feed line 44 into the accumulator 42, where it may be distributed through the accumulator discharge line 46 to be used by the fuel cell 10 to humidify the reducing fluid and/or process oxidant stream, or to supply steam for a boiler (not shown) of a fuel processing (not shown), well-known in the art. In that case, some of the antifreeze solution would enter the anode flow field within the fuel channels 72. Additionally, antifreeze solution passing through the anode side coolant channels 78A, 78B, 78C also passes into the anode water transport plate 60 which is in direct fluid communication with the anode catalyst 54. By wetproofing the porous anode substrate 58 and/or the porous anode diffusion layer 66 in the manner described above in the exemplary tests, the antifreeze solution within the porous anode water transport plate and the fuel channels 72 is restricted from moving into contact with the anode catalyst 54. Consequently, it can be seen that in the direct antifreeze cooled fuel cell 10 almost all water is exposed to the direct antifreeze solution, and hence will not freeze during operation of the cell, or during cell shut down. The water within the electrolyte is not exposed to the direct antifreeze solution, however during operation of the cell 10, heat is generated by the well-known electrochemical reactions that prevent any freeze problems for water within the electrolyte. During shut down of the direct antifreeze fuel cell 10, a portion of the relatively small amount of water within the electrolyte will evaporate and pass as a vapor through the adjacent porous anode and cathode diffusion and substrate layers into the cathode and anode water transport plates 64, 60, and simultaneously some of the antifreeze solution will evaporate and move into the electrolyte to lower the freezing temperature of a solution remaining in the electrolyte, thus also minimizing freezing and subsequent melt requirements for start up of the fuel cell 10. Upon start up, any antifreeze solution adsorbed by the cell anode and cathode catalysts 54, 56, or contained in the electrolyte 52, will be oxidized by the anode and cathode catalysts by the cell potentials during a start up procedure.

Accordingly, it can be seen that the unique physical and chemical properties of the direct antifreeze cooled fuel cell 10 cooperate to produce an unexpected result that using a direct antifreeze solution as a cooling fluid in direct fluid communication with cell anode and cathode catalysts 54, 56 does not significantly decrease cell performance. Moreover, the direct antifreeze cooled fuel cell 10 dramatically enhances overall fuel cell efficiency by enabling the fuel cell 10 to be operated in sub-freezing conditions without need for complicated, costly, heavy, large sealed coolant system components and/or a reducing and process oxidant stream humidification system that requires purification or membrane barrier components to isolate the antifreeze solution from the fuel cell anode and cathode catalysts 54, 56.

While the present invention has been described and illustrated with respect to a particular construction of a direct antifreeze cooled fuel cell 10, it is to be understood that the fuel cell is not to be limited to the described and illustrated embodiments. For example, while the test results of the exemplary fuel cell described above are for a cell utilizing a PEM electrolyte, the fuel cell 10 may use alternative electrolytes known in the art. Additionally, while the illustrated embodiment shows an anode diffusion layer 66 between the anode substrate 58 and the anode catalyst 54, and shows a cathode diffusion layer 68 between the cathode substrate 62 and the cathode catalyst 56, it is to be understood that in an alternative embodiment of the fuel cell 10 the diffusion layers 66, 68 may be eliminated, and the cathode substrate 62 and anode substrate 58 may be secured adjacent to and supporting the cathode catalyst 56 and anode catalyst 54 respectively. When both substrate 58, 62 and diffusion 66, 68 layers are utilized, wetproofing of one such layer on either side of the electrolyte may be eliminated, provided at least one porous, wetproofed layer remains between the antifreeze contained in the water transport plates and the anode and/or cathode catalyst. Additionally, while the required properties for a direct antifreeze solution have been described relative to a fuel cell operating at about 150° F., it is to be understood that the required properties are independent of the operating temperature of the fuel cell 10. As a further example, the above descriptions refer to fuel cells operated at about or slightly above ambient pressures, however the scope of the present invention includes application to more highly pressurized fuel cells. Consequently, reference should be made primarily to the following claims rather than the foregoing description to determine the scope of the invention.

What is claimed is:

1. A direct antifreeze cooled fuel cell for producing electrical energy from a reducing fluid and a process oxidant stream, comprising:
   a. an electrolyte secured between an anode catalyst and a cathode catalyst;
   b. a porous anode substrate secured in direct fluid communication with the anode catalyst for passing the reducing fluid stream adjacent the anode catalyst and a wetproofed cathode support means secured in direct fluid communication with the cathode catalyst for passing the process oxidant stream adjacent the cathode catalyst;
   c. a porous cooler plate secured in direct fluid communication with the wetproofed cathode support means; and,
   d. a direct antifreeze solution passing through the porous cooler plate for cooling the fuel cell, wherein the direct antifreeze solution is an alkanetriol direct antifreeze solution.

2. The direct antifreeze cooled fuel cell of claim 1, wherein the antifreeze solution is an alkanetriol direct antifreeze solution selected from the group consisting of glycerol, butanetriol, and pentanetriol.

3. The direct antifreeze cooled fuel cell of claim 1, wherein the fuel cell includes a pressure control means for maintaining a positive pressure differential between the process oxidant stream passing through the fuel cell and the antifreeze solution passing through the porous cooler plate so that the process oxidant stream within the fuel cell is at a greater pressure than the antifreeze solution within the cooler plate.

4. The direct antifreeze cooled fuel cell of claim 1, wherein the process oxidant stream enters an oxidant inlet of the fuel cell at greater than approximately 30% relative humidity at a temperature at the oxidant inlet.

5. The direct antifreeze cooled fuel cell of claim 1, wherein the wetproofed cathode support means includes a wetproofed cathode diffusion layer secured between a wetproofed cathode substrate and the cathode catalyst.

6. The direct antifreeze cooled fuel cell of claim 1, wherein the wetproofed cathode support means includes a wetproofed cathode diffusion layer secured between a cathode substrate and the cathode catalyst.

7. The direct antifreeze cooled fuel cell of claim 1, wherein the electrolyte is a proton exchange membrane.

8. A direct antifreeze cooled fuel cell for producing electrical energy from a reducing fluid and a process oxidant stream, comprising:
   a. an electrolyte secured between an anode catalyst and a cathode catalyst;
   b. a wetproofed anode support means secured in direct fluid communication with the anode catalyst for passing the reducing fluid stream adjacent the anode catalyst and a wetproofed cathode support means secured in direct fluid communication with the cathode catalyst for passing the process oxidant stream adjacent the cathode catalyst;
   c. a porous anode cooler plate secured in direct fluid communication with the wetproofed anode substrate means, and a porous cathode cooler plate secured in direct fluid communication with the wetproofed cathode support means; and,
   d. a direct antifreeze solution passing through the porous anode and cathode cooler plates for cooling the fuel cell, wherein the antifreeze solution is an alkanetriol direct antifreeze solution having;
      i. a freezing point of at least −20° F.;
      ii. a surface tension greater than 60 dyne/cm at an operating temperature of the fuel cell;
      iii. a partial pressure of antifreeze above the solution at the cell operating temperature that is less than 0.005 mm Hg; and,
      iv. a capacity of being oxidized by the anode and cathode catalysts at fuel cell voltages.

9. The direct antifreeze cooled fuel cell of claim 8, wherein the antifreeze solution is an alkanetriol direct antifreeze solution selected from the group consisting of glycerol, butanetriol, and pentanetriol.

10. The direct antifreeze cooled fuel cell of claim 8, wherein the fuel cell includes a pressure control means for maintaining a positive pressure differential between the process oxidant stream passing through the fuel cell and the antifreeze solution passing through the porous anode and cathode cooler plates so that the process oxidant stream within the fuel cell is at a greater pressure than the antifreeze solution within the cooler plates.

11. The direct antifreeze cooled fuel cell of claim 8, wherein the process oxidant stream enters an oxidant inlet of the fuel cell at greater than approximately 30% relative humidity at a temperature of the oxidant inlet.

12. The direct antifreeze cooled fuel cell of claim 8, wherein the wetproofed cathode support means includes a wetproofed cathode diffusion layer secured between a cathode substrate and the cathode catalyst, and the wetproofed anode support means includes a wetproofed anode diffusion layer secured between an anode substrate and the anode catalyst.

13. The direct antifreeze cooled fuel cell of claim 8, wherein the electrolyte is a proton exchange membrane.

14. A direct antifreeze cooled fuel cell for producing electrical energy from a reducing fluid and a process oxidant stream, comprising:
   a. a proton exchange membrane electrolyte secured between an anode catalyst and a cathode catalyst;
   b. a wetproofed anode support means secured in direct fluid communication with the anode catalyst for passing the reducing fluid stream adjacent the anode catalyst and a wetproofed cathode support means secured in direct fluid communication with the cathode catalyst for passing the process oxidant stream adjacent the cathode catalyst;
   c. a porous anode cooler plate secured in direct fluid communication with the wetproofed anode support means, and a porous cathode cooler plate secured in direct fluid communication with the wetproofed cathode support means; and,
   d. an alkanetriol direct antifreeze solution passing through the porous anode and cathode cooler plates for cooling the fuel cell.

15. The direct antifreeze cooled fuel cell of claim 14, wherein the fuel cell includes a pressure control means for maintaining a positive pressure differential between the process oxidant stream passing through the fuel cell and the antifreeze solution passing through the porous anode and cathode cooler plates so that the process oxidant stream within the fuel cell is at a greater pressure than the antifreeze solution within the cooler plates.

16. The direct antifreeze cooled fuel cell of claim 15, wherein the process oxidant stream enters an oxidant inlet of the fuel cell at greater than approximately 30% relative humidity at a temperature at the oxidant inlet.

17. The direct antifreeze cooled fuel cell of claim 16, wherein the wetproofed cathode support means includes a wetproofed cathode diffusion layer secured between a cathode substrate and the cathode catalyst, and the wetproofed anode support means includes a wetproofed anode diffusion layer secured between an anode substrate and the anode catalyst.

18. The direct antifreeze cooled fuel cell of claim 17, wherein the direct antifreeze solution defines an antifreeze solution coolant stream flow pattern through the fuel cell that is transverse-concurrent to an oxidant flow axis defined by the process oxidant stream passing through the fuel cell, and wherein the reducing fluid stream defines a reducing fluid flow pattern through the fuel cell that is transverse-concurrent to the oxidant flow axis.

* * * * *